Jan. 16, 1923.

W. T. HILL.
TROLLEY.
FILED JUNE 15, 1922.

1,442,273.

2 SHEETS—SHEET 1.

William T. Hill.
INVENTOR
BY Victor J. Evans
ATTORNEY

WITNESS:
R. E. Wise

Jan. 16, 1923.

W. T. HILL.
TROLLEY.
FILED JUNE 15, 1922.

1,442,273.

2 SHEETS—SHEET 2.

William T. Hill
INVENTOR
BY Victor J. Evans
ATTORNEY

WITNESS: R E Wise

Patented Jan. 16, 1923.

1,442,273

UNITED STATES PATENT OFFICE.

WILLIAM T. HILL, OF YORK HARBOR, MAINE.

TROLLEY.

Application filed June 15, 1922. Serial No. 568,556.

*To all whom it may concern:*

Be it known that I, WILLIAM T. HILL, a citizen of the United States, residing at York Harbor, in the county of York and State of Maine, have invented new and useful Improvements in Trolleys, of which the following is a specification.

This invention relates to trolley wheels and has for its object the provision of a novel trolley catcher attachment designed to be mounted upon the ordinary trolley head for the purpose of preventing the trolley wheel from jumping the trolley wire, the attachment including arms which are normally spring pressed into operative position but which are yieldable when striking against the cross wires which support the trolley wire at intervals.

An important object is the provision of an attachment of this character which may be associated with the ordinary harp without involving any alterations in the construction thereof, the attachment being moreover capable of being quickly and easily applied without the necessity for the employment of any special tools.

An additional object is the provision of a device of this character which will be simple and inexpensive in manufacture, and installation, highly efficient in use, positive in action, durable in service and a general improvement in the art.

Figure 1:
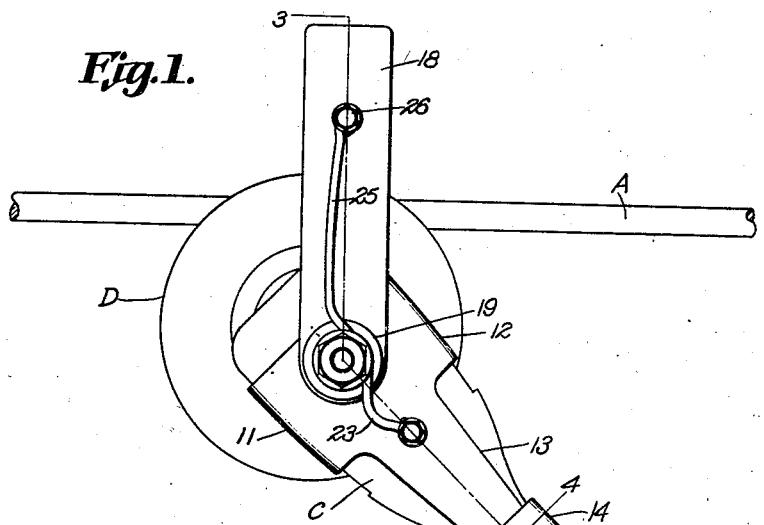
Figure 2:
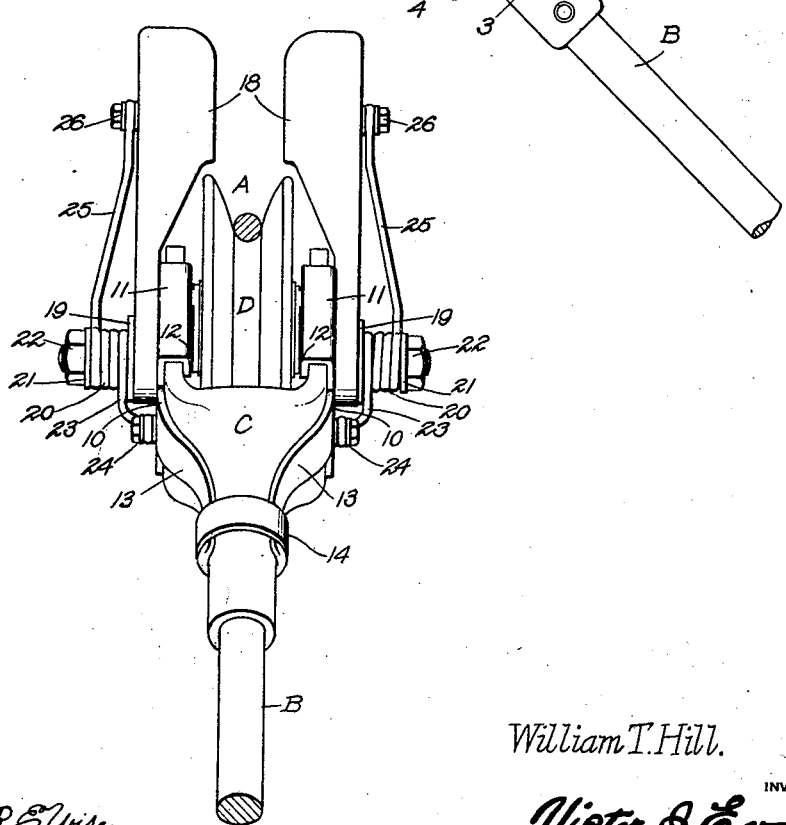
Figure 3:
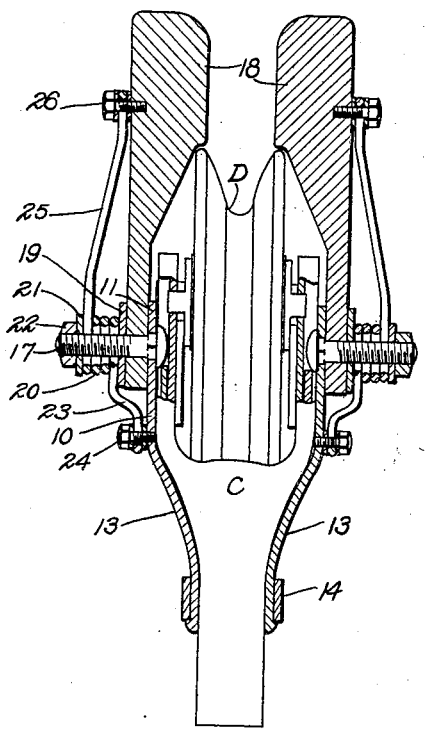
Figure 5:
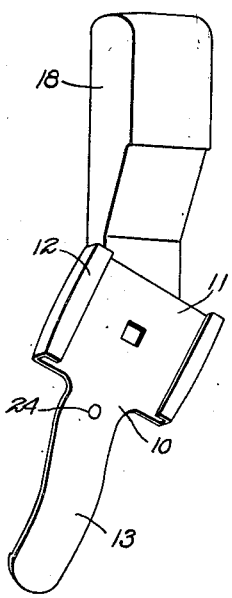
Figure 4:
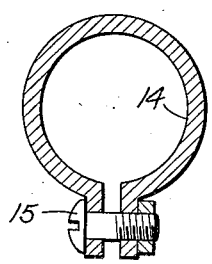

With the above and other objects and advantages in view the invention consists in the details of construction to be hereinafter more fully described and claimed and illustrated in the accompanying drawings, in which:

Figure 1 is a side elevation of a trolley head showing my device applied thereto, Figure 2 is an edge view, Figure 3 is a cross section taken through the supporting bolts for the catcher arms, Figure 4 is a cross section taken through the clamp, Figure 5 is a detail perspective view of one of the supporting members and the arm associated therewith.

Referring more particularly to the drawings the letter A designates a trolley wire, B designates a trolley pole which carries the usual harp C within which is journaled the grooved trolley wheel D. These parts are old and well known.

In carrying out my invention I provide a pair of supports 10 which are mounted upon opposite sides of the harp and which may be constructed preferably of sheet metal of any kind having sufficient strength to withstand whatever strain the device may be subjected to. Each of these supports 10 includes a body portion 11 formed at its opposite edges with flanges 12 engageable about the edges of a side of the harp. Formed upon each body is an elongated extension 13 which is somewhat curved as illustrated so as to lie against the unforked portion of the harp or head. These supports are slidably engaged upon the harp and are held in position by a circular split clamp 14 which encircles the base of the head or harp and also the extensions 13, adjustment being made by a clamping screw 15.

Extending through a square hole in the center of each body member 11 is the square shank of a bolt 17 which has its threaded end extending outwardly with respect to the wheel. Pivoted upon each bolt is a catcher arm 18 through which the bolt extends. I provide a washer 19 on the bolt engaging the arm and also provide a spring which has its intermediate portion coiled as shown at 20 and engaged upon the bolt and retained thereon by a washer 21 and a nut 22. One arm 23 of the spring is connected with the support 10 as shown at 24 and the other arm 25 is connected with the arm 18 as shown at 26, so that the springs will operate to hold the catcher arms 18 in elevated position.

These catcher arms may be constructed of any preferred material and have their free ends thickened so as to extend over the edges of the wheel and consequently prevent the trolley wire from becoming caught between the wheel and the sides of the harp.

In the operation of the device it will be seen that in case the trolley wheel has any tendency to jump the wire the arms 18 will operate to prevent this action and to return the wheel to proper position in engagement with the wire. Owing to the fact that the arms 18 are spring pressed it is apparent that they will yield downwardly whenever the wheel passes over the cross wires which support the trolley wire without causing any injury to any of the parts.

From the foregoing description and a study of the drawings it will be apparent that I have thus provided a very simply constructed and easily applied attachment which will efficiently operate to prevent jumping of trolley wheels and the frequent accidents occasioned by such happenings. It is to be noted that the device is capable of application without making any holes in or otherwise altering the trolley head or harp, the device being maintained in position particularly by a clamping action. As the construction is so simple and the parts so few it is evident that there is nothing to get out of order and that the device should have a long life.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. An attachment for trolley harps comprising a pair of supports detachably and longitudinally slidably engaged upon opposite sides of the harp and formed with flanges engaging the sides thereof to prevent lateral displacement, clamping means engaging said supports and embracing the base of the harp, pivot elements extending outwardly from said supports, and spring pressed arms pivotally mounted upon said pivot elements and partially overlying the edges of the wheel.

2. An attachment of the character described comprising a pair of supports slidably engaged upon the opposite sides of a trolley harp, means for clamping said supports in position, and spring pressed arms pivoted upon the supports and overlying the edge of the wheel.

3. An attachment for trolley harps comprising a pair of supports detachably and slidably engaged upon the opposite sides of the harp and flanged to prevent lateral displacement, said supports including elongated extensions engaging against opposite sides of the base of the harp, a clamp holding said extensions to the base, pivot bolts extending from the supports, and spring pressed arms mounted upon said pivot members and partially overlying the edge of the wheel.

In testimony whereof I affix my signature.

WILLIAM T. HILL.